United States Patent [19]

Lupoli et al.

[11] Patent Number: 4,717,401
[45] Date of Patent: Jan. 5, 1988

[54] FUEL VAPOR RECOVERY SYSTEM

[75] Inventors: Peter J. Lupoli, Hamden; Donald J. Mattis, Norwalk; Robert S. Miller, Stratford, all of Conn.

[73] Assignee: Casco Products Corporation, Bridgeport, Conn.

[21] Appl. No.: 911,112

[22] Filed: Sep. 24, 1986

[51] Int. Cl.⁴ .............................................. B01D 53/04
[52] U.S. Cl. ................................... 55/208; 55/267; 55/316; 55/387
[58] Field of Search ............... 55/208, 267, 316, 387; 123/518-521, 549; 210/266, 285, 286

[56] References Cited

U.S. PATENT DOCUMENTS

| | | | |
|---|---|---|---|
| 359,259 | 3/1887 | Kaiser | 210/285 |
| 2,369,915 | 2/1945 | Quinn | 210/286 X |
| 2,381,354 | 8/1945 | Larson | 55/316 X |
| 3,191,587 | 6/1965 | Hall | 55/387 X |
| 3,221,724 | 12/1965 | Wentworth | |
| 3,460,522 | 8/1969 | Kittler et al. | 55/316 X |
| 3,556,734 | 1/1971 | Peterson | 55/387 X |
| 3,675,634 | 7/1972 | Tatsutomi et al. | |
| 3,683,597 | 8/1972 | Beveridge et al. | 55/316 |
| 3,757,753 | 9/1973 | Hunt | 220/85 |
| 3,927,300 | 12/1975 | Wada et al. | 219/381 |
| 4,108,125 | 8/1978 | Marcoux et al. | 261/142 X |
| 4,279,234 | 7/1981 | Marcoux et al. | 123/549 |
| 4,300,511 | 11/1981 | Lang | 123/520 |
| 4,338,106 | 7/1982 | Mizuno et al. | 55/316 |
| 4,365,981 | 12/1982 | McDonough | 55/387 X |
| 4,386,947 | 6/1983 | Mizuno et al. | 55/316 X |
| 4,387,690 | 6/1983 | Chiavaroli | 123/549 |
| 4,403,587 | 9/1983 | Mizuno et al. | 55/316 X |
| 4,448,173 | 5/1984 | Abe et al. | 123/549 |
| 4,448,594 | 5/1984 | Kozawa | 55/316 X |
| 4,450,823 | 5/1984 | Abe et al. | 123/549 |
| 4,477,715 | 10/1984 | Bell et al. | 123/549 X |
| 4,581,047 | 4/1986 | Larsson | 55/387 X |
| 4,582,516 | 4/1986 | Kadi | 55/387 X |

FOREIGN PATENT DOCUMENTS

| | | | |
|---|---|---|---|
| 563555 | 12/1923 | France | 55/387 |
| 56-544 | 1/1981 | Japan . | |
| 227405 | 6/1925 | United Kingdom . | |
| 334663 | 9/1930 | United Kingdom | 210/286 |
| 346468 | 4/1931 | United Kingdom | 210/285 |
| 500446 | 2/1939 | United Kingdom . | |
| 620397 | 3/1949 | United Kingdom . | |
| 659268 | 10/1951 | United Kingdom . | |
| 673702 | 6/1952 | United Kingdom . | |
| 704491 | 2/1954 | United Kingdom . | |
| 706045 | 3/1954 | United Kingdom . | |
| 944669 | 12/1963 | United Kingdom . | |
| 1530152 | 10/1978 | United Kingdom . | |
| 1533559 | 11/1978 | United Kingdom . | |
| 1537302 | 12/1978 | United Kingdom . | |
| 2124103 | 2/1984 | United Kingdom . | |

Primary Examiner—Robert Spitzer
Attorney, Agent, or Firm—Mitchell D. Bittman

[57] ABSTRACT

A fuel vapor recovery canister having a housing including an outer wall with spaced-apart vapor ports. Adsorbent material in the housing adsorbs and stores fuel vapors entering one vapor port, or under other circumstances releases such vapors for exit through one of the ports. In one embodiment the housing has interleaved baffle plates between the ports, which force vapors entering one port to flow along a serpentine path, giving maximum exposure of the vapor to the adsorbent material. In a second embodiment, a helical partition is provided, similarly forcing vapor flow to occur along a serpentine path.

26 Claims, 15 Drawing Figures

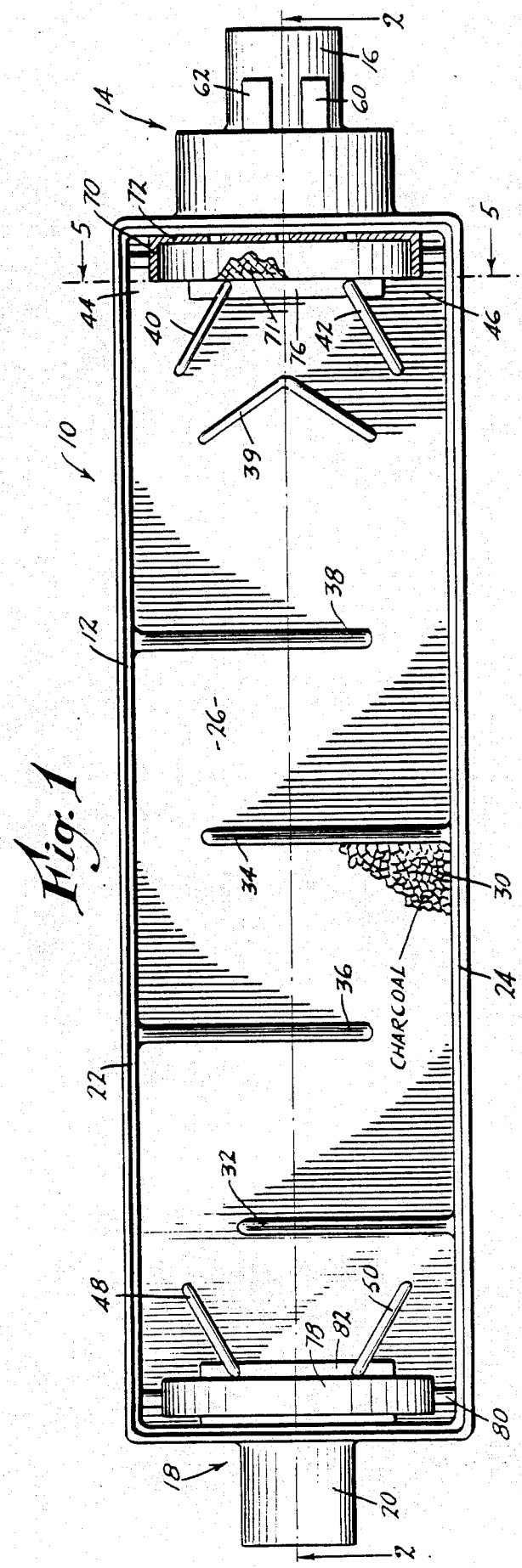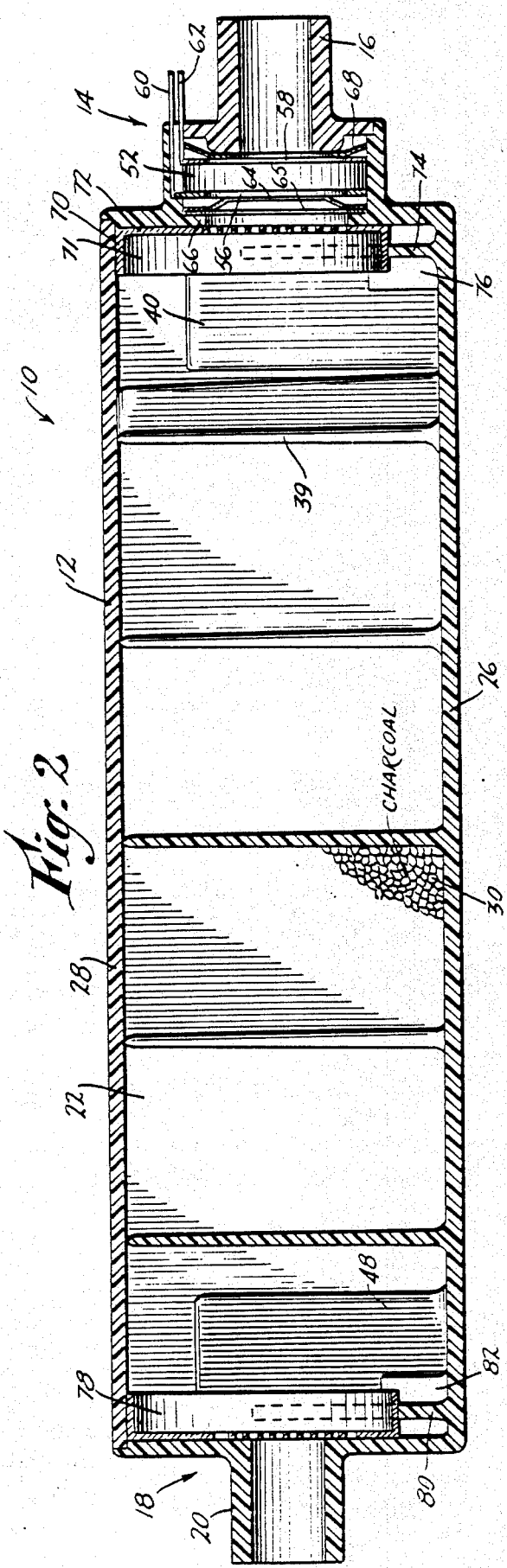

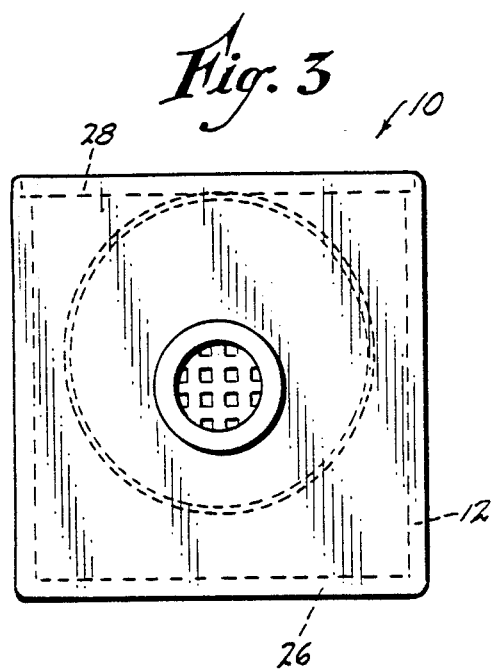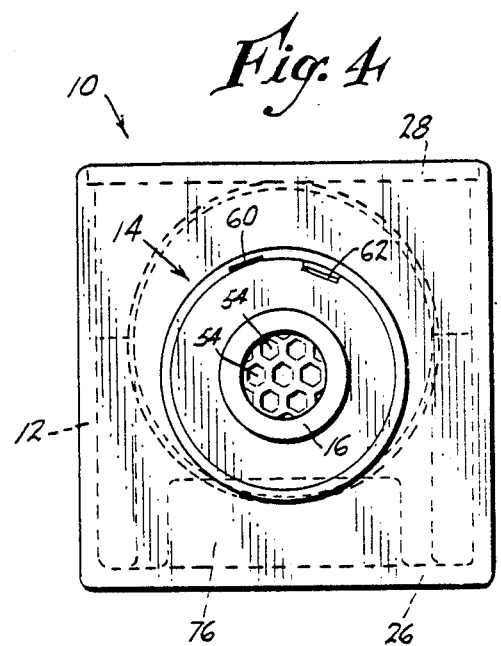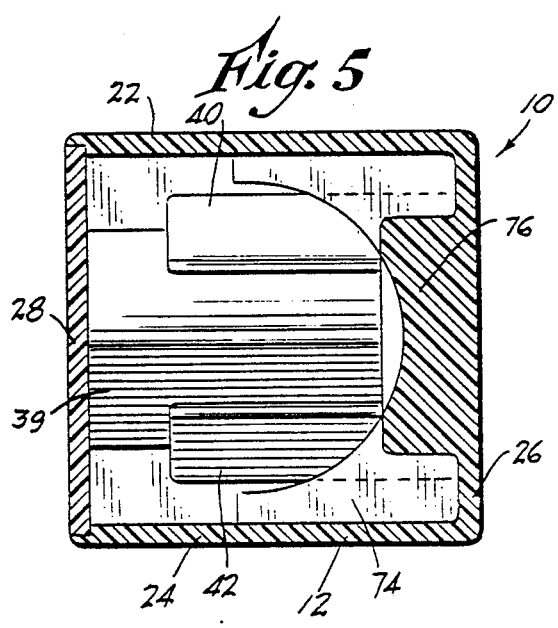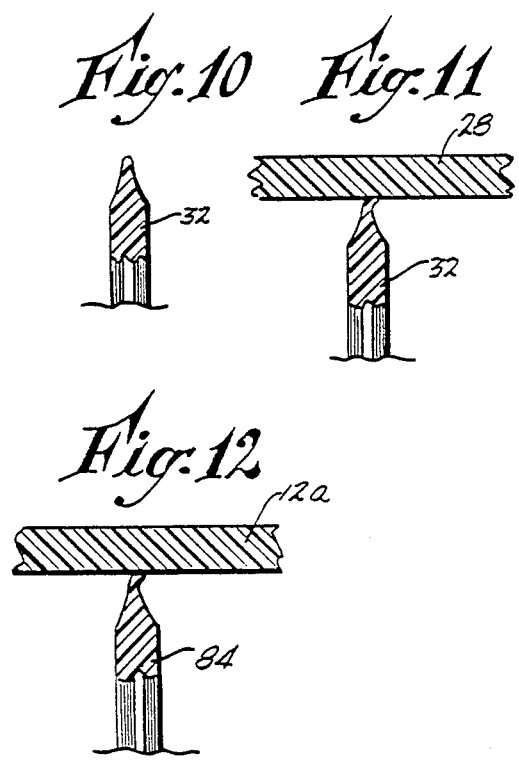

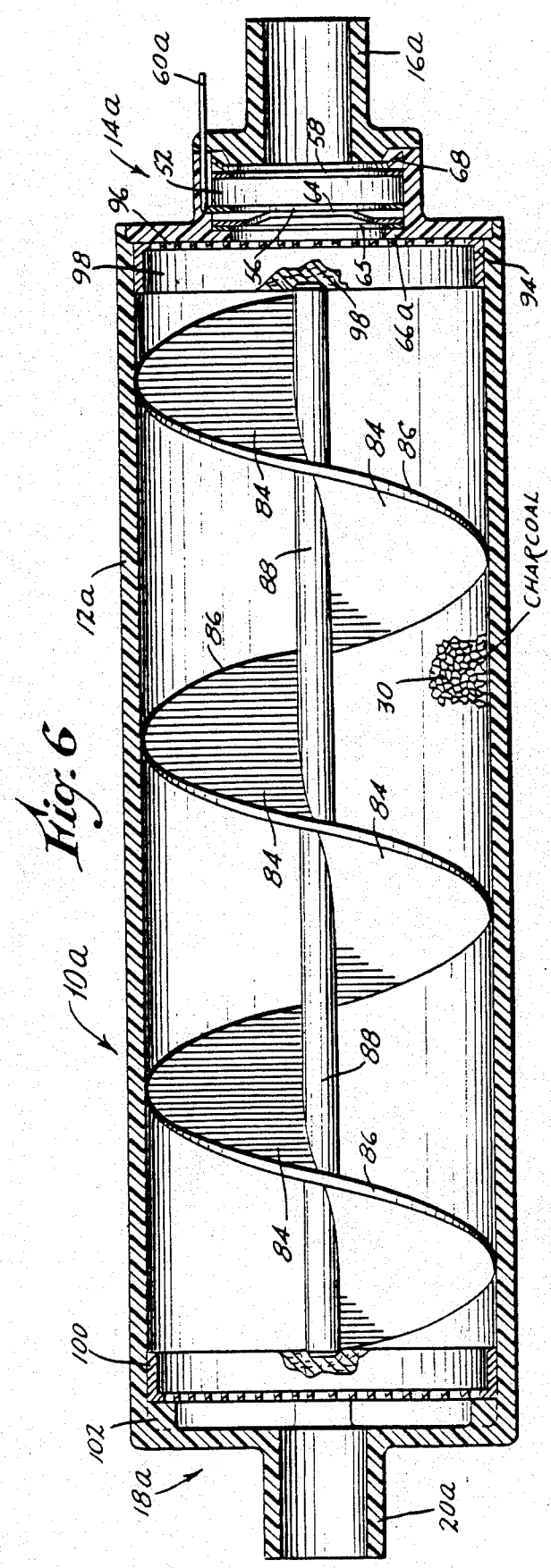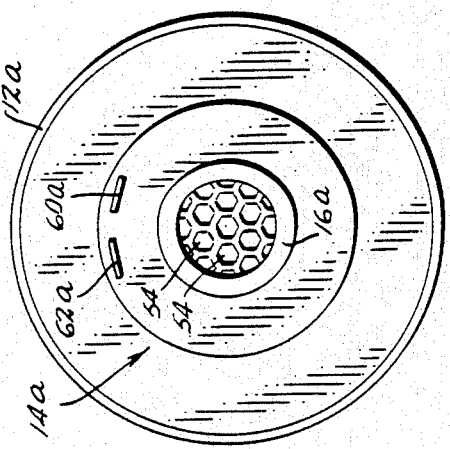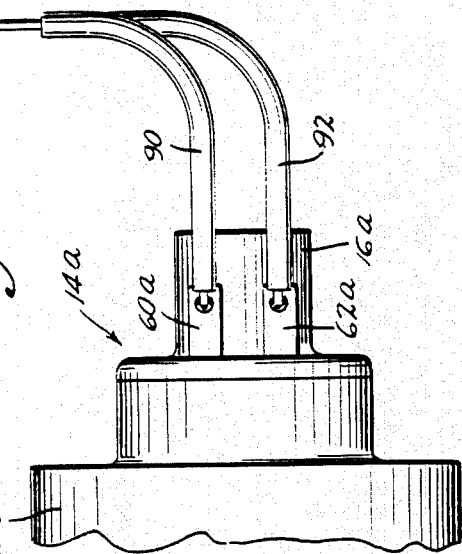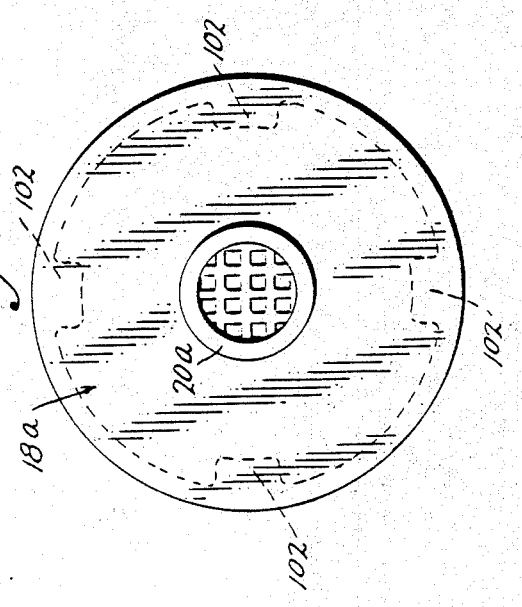

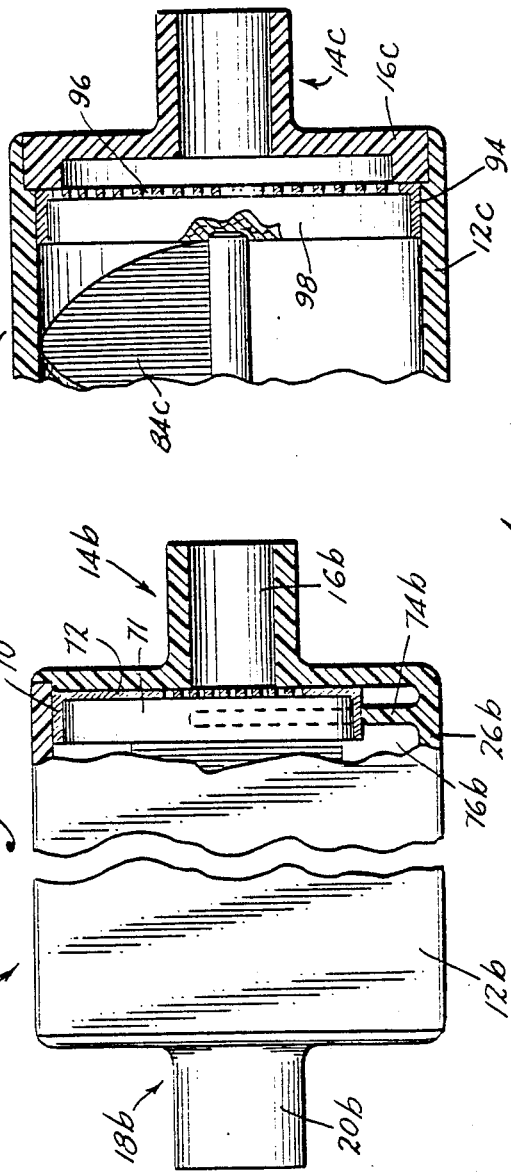

FUEL VAPOR RECOVERY SYSTEM

CROSS REFERENCES TO RELATED APPLICATIONS

1. U.S. application Ser. No. 717,515 filed Mar. 28, 1985 in the names of Peter J. Lupoli, Donald J. Mattis, and Robert S. Miller, entitled FUEL VAPOR RECOVERY SYSTEM FOR AUTOMOTIVE VEHICLES, now: U.S. Pat. No. 4,598,686 dated July 8, 1986, and having common ownership with the present application.

2. Copending U.S. application Ser. No. 912,290, filed July 8, 1986 in the names of Peter J. Lupoli, Donald J. Mattis, and Robert S. Miller, entitled FUEL VAPOR RECOVERY SYSTEM FOR AUTOMOTIVE VEHICLES, which is a continuation of U.S. application Ser. No. 717,515 identified above, said continuation application having common ownership with the present application, now abandoned.

3. Copending U.S. application Ser. No. 881,811, filed July 2, 1986 in the names of Peter J. Lupoli, Donald J. Mattis and Robert S. Miller, entitled CANISTER HEATER WITH PTC WAFER, and having common ownership with the present application.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates to improvements in motor vehicle fuel vapor recovery systems of the type incorporating canisters that contain adsorbent material capable of absorbing and storing vapors from the vehicle's fuel tank, such vapors resulting mainly from evaporation while the vehicle is idle, or displacement of existing vapors in the tank as it is being filled.

In particular, the invention involves fuel-vapor recovery canisters that are intended to collect fuel vapors from a vent port on a vehicle's fuel tank, store such vapors, and eventually release them and channel them to the vehicle's engine, to be burned.

2. Description of the Related Art Including Information Disclosed Under 37 CFR §§1.97–1.99

Currently attempts are being made to limit the escape of gasoline vapors from automotive fuel systems, especially the evaporation which occurs while the vehicles are idle. Special fuel tank caps have been used in order to reduce or eliminate fumes that would otherwise escape. In addition, flexible hoods or bushings have been employed in conjunction with the nozzles on the hoses of gasoline pumps, in order to restrict leakage of vapor from the neck of the tank's filler pipe.

In our patent application U.S. Ser. No. 717,515 filed Mar. 28, 1985 in the names of Peter J. Lupoli, Donald J. Mattis, and Robert S. Miller, entitled FUEL VAPOR RECOVERY SYSTEM FOR AUTOMOTIVE VEHICLES, now: U.S. Pat. No. 4,598,686 dated July 8, 1986, as above identified, there is illustrated and described a number of canister constructions adapted to collect and store fuel vapors that originate in the vehicle's fuel tank, and to subsequently purge such vapors and direct them to either the vehicle's carburetor or the engine intake manifold to be burned upon commencement of engine operation. The canisters generally contain granules of carbon or activated charcoal.

All of the canisters disclosed in the above application are of a type which accept vapors from a fuel tank vent port that is connected to the canister through a vapor line, and which rely upon intake of air from the engine compartment to draw off or "purge" stored vapor/condensate after the engine is started. Following such purging of the stored vapor, the adsorbent material in the canister again becomes available for use in collecting and storing subsequently produced vapors.

As presently understood, with canisters of relatively simple geometric shape, such as cylindrical or rectangular units, vapor flow tends to be greatest in certain areas of the canister, namely those adjacent the vapor inlet port, the purge port, and the fresh air inlet port. It is believed that at regions of the canister interior which are adjacent to its walls, flow is more limited. Accordingly the adsorption efficiency of the granules in such regions is reduced, due to their limited exposure to the incoming fuel vapors, as well as their exposure to the air during purging. Stated differently, it is believed that many of the granules do not adsorb and store as much vapor/condensate as others, and thus the overall efficiency of the system is not as high as it might be if an improved flow distribution could be achieved.

In addition, many of the canisters in use are physically large, which presents problems where only limited space is available for automotive accessories of this kind.

SUMMARY OF THE INVENTION

The present invention overcomes the drawbacks of prior recovery systems, constituting an improved vapor recovery means from the standpoint of simplicity, lower cost, and considerable reduction in physical size.

Accordingly, one object of the present invention is the provision of a novel and improved fuel vapor recovery canister which is extremely simple in its structure, resulting in both low cost and small physical size as compared with previous devices of this type.

A related object of the invention is to provide an improved vapor recovery canister as above set forth, characterized by a large vapor storage capacity and high efficiency without having to resort to physically large canister structures.

Another object of the invention is to provide an improved vapor recovery canister of the kind indicated, wherein vapor flow is directed along a relatively long, serpentine path that maximizes contact of the vapor with the adsorbent material and insures that most of this material is uniformly exposed to the vapor. Improved storage capacity is thus realizeable.

Yet another object of the invention is to provide an improved vapor recovery canister of the type noted, wherein the components are for the most part constituted as relatively simple, molded plastic parts and simple metal stampings, whereby there is reduced the overall manufacturing cost and assembly time.

The above objects are accomplished by a fuel vapor recovery canister comprising, in combination, a housing having an outer wall and spaced-apart vapor ports disposed in the wall, a quantity of adsorbent material carried in the housing and adapted to adsorb and store vapors entering one of the ports or to release vapors and permit them to exit through one vapor port thereof, and means carried by the housing, defining a series of interleaved baffle plates disposed between the ports, whereby any vapors entering one port are forced to flow along a serpentine path through the housing as they approach the other port.

The objects are further accomplished in another embodiment, by a fuel vapor recovery canister comprising, in combination, an elongate, tubular housing having a vapor port adjacent one end and another vapor port adjacent the other end, a quantity of adsorbent material carried in the housing and adapted to adsorb and store vapors entering one vapor port thereof, or to release vapors and permit them to exit through one vapor port thereof, and means carried by the housing, defining a partition of generally helical configuration, whereby vapors entering one of the vapor ports are forced to flow along a circuitous, generally helical, swirling path about the axis of the helix as they approach the other vapor port thereof.

Small physical size is thus realizeable without sacrifice of vapor storage capacity. Increased exposure of the adsorbent material to the vapor is also achieved; accordingly a larger percentage of the adsorbent material is made available for storage or release of fuel vapors.

In the event that increased storage capacity is desired, two or more of the present improved canisters can be employed, connected in series or in parallel with one another.

Other features and advantages will hereinafter appear.

BRIEF DESCRIPTION OF THE DRAWINGS

FIG. 1 is a fragmentary top plan view of the improved vapor recovery canister of the present invention, namely the housing with cover plate thereof removed so as to reveal interior details of the housing construction.

FIG. 2 is a vertical longitudinal section taken on the line 2—2 of FIG. 1, and showing a heater contained in the housing.

FIG. 3 is a left end elevation of the improved vapor recovery canister of FIGS. 1 and 2.

FIG. 4 is a right end elevation of the vapor recovery canister of FIGS. 1–3.

FIG. 5 is a transverse section taken on the line 5—5 of FIG. 1.

FIG. 6 is a vertical section like that of FIG. 2, of a modified canister, this canister also containing a heater, and constituting another embodiment of the invention.

FIG. 7 is a left end elevation of the canister of FIG. 6.

FIG. 8 is a right end elevation of the canister of FIGS. 6 and 7.

FIG. 9 is a fragmentary top plan view of the right end portion of the canister of FIGS. 6–8.

FIG. 10 is a fragmentary section through an edge of one of the baffle plates of the canister of FIGS. 1–5.

FIG. 11 is a fragmentary section similar to that of FIG. 10, showing the edge of the baffle plate deformed by the cover plate of the housing, such that the cover plate and baffle plate firmly engage one another along the line of contact between the two parts.

FIG. 12 is a fragmentary section similar to FIG. 11, showing the feathered edge of the helical partition of FIG. 6 deformed by the inner surface of the housing, such that the latter forms a seal along its helical line of contact with the partition.

FIG. 13 is a fragmentary view, partly in side elevation and partly in axial section, of a modified canister having a structure similar to that of FIGS. 1–5 with the exception that the heater has been omitted.

FIG. 14 is a fragmentary axial section of a still further modified canister, similar in structure to that of FIGS. 6–9 with the exception that the heater has been omitted, and FIG. 15 is a block diagram of an automobile fuel tank incorporating a normally-closed blocking valve and a series of canisters constructed in accordance with the present invention and employed in a breather arrangement that alternately collects and stores fuel vapors from the vehicle's tank, and subsequently releases them upon the application of vacuum through the valve, which open during engine operation.

DESCRIPTION OF THE PREFERRED EMBODIMENT

Referring first to FIGS. 1–5 the fuel vapor recovery system for automotive vehicles as provided by a preferred embodiment of the invention comprises a canister designated generally by the numeral 10, which is intended to be connected to a vent port on the vehicle's fuel tank. The canister 10 comprises an elongate housing 12 having a vapor port 14 with an end fitting or nipple 16, and another vapor port 18 comprising an end fitting or nipple 20. The housing 12 is preferably constituted of molded plastic, and has a trough-like configuration, with oppositely-disposed side walls 22, 24, a bottom wall 26 and, as a separate piece, a top wall in the form of a cover plate 28. The housing 12 is completely filled with a quantity of adsorbent material, preferably carbon granules or activated charcoal granules, indicated at 30.

Flow through the canister is bi-directional, as will be explained below. When flow is toward the right in FIGS. 1 and 2, the fluid entering the port 18 comprises fuel-laden vapor that originates in the vehicle's fuel tank. On the other hand, when flow is toward the left in these figures, the fluid entering the port 14 is fresh air, and contains essentially no fuel vapor. Such flow would occur during a "purging" operation wherein fuel vapor/condensate stored in adsorbent material in the canisters is released, and eventually drawn into the vehicle's engine to be burned.

In accordance with the present invention the housing 12 is provided with a series of interleaved baffle plates designated 32, 34, 36 and 38, the plates 32 and 34 preferably being molded integral with the bottom wall 26 and side wall 24 of the housing, and the plates 36 and 38 being similarly molded integral with walls 26 and 22, as shown. An additional baffle plate 39 of V-shaped cross section is disposed adjacent the port 14, and effectively disperses the flow of vapor in the area, toward the side walls 22, 24. Also, a pair of diverter vanes 40, 42 is preferably included at the port 14, which function in a manner similar to the baffle plate 39. In particular, they disperse or collect vapor streams, depending upon the direction of flow of the stream. When vapor flow (fresh air) is in a direction entering the port 14, the vanes direct it toward the two right hand corners 44 and 46 of the housing 12 as seen in FIG. 1, such that the granules of adsorbent material occupying these areas are exposed to the stream.

A pair of diverter plates 48, 50 is disposed adjacent to the port 18 of the housing 12, these functioning in a manner similar to the vanes 40, 42.

Referring again to FIG. 2 and in accordance with the present invention there is provided an element or mass 52 of positive temperature coefficient (PTC) material adjacent the port 14 of the housing 12, such mass being in the form of a wafer or slab, preferably having a series of transverse apertures 54, FIG. 4, through which vapors in the form of an air stream flow as they enter this port. The PTC material is engaged by two ring contacts 56, 58 carrying electrical terminals 60, 62 respectively that are integral therewith and which extend to the outside of the housing 12 in order to permit electrical connections to be made to the PTC material 52. In order to facilitate mounting of the latter, the end fitting 16 is initially molded as a separate piece and the ring contact terminals 60, 62 extend through suitable clearance slots in the fitting 16 or the housing 12. A wave washer 64 is disposed against a ring 65 which is positioned against an annular shoulder 66 in the housing, and a retainer washer 68 pressed into place prior to installation of the end fitting 16. The latter is preferably sonic welded in position, and becomes an integral part of the housing 12.

Adjacent the port 14 is a retainer cup 70 having multiple apertures in its bottom wall 72, the cup 70 containing filter material such as fiberglass wadding 71, which retains the granules 30 and keeps dirt or debris from entering the housing interior. The cup 70 is mounted on a semi-circular upwardly facing support shoulder or saddle 74 that is molded integral with the bottom wall 26 and side walls 22, 24 of the housing. In addition, a block 76, shown in FIGS. 1 and 2, is integrally formed with the housing bottom wall, and provides support for both the vanes 40, 42 and the lower portion of the retainer cup 70.

A similar apertured retainer cup 78 is mounted adjacent the housing port 18, being carried on a saddle 80 and mounting block 82, the latter also supporting the plates 48, 50.

Further, by the present invention the upper edges of the baffle plates 32, 34, 36, 38 and 39 are feathered and deformable, as in FIGS. 10 and 11. When the cover plate 28 is installed, these edges bend slightly, to engage the undersurface of the plate 28. The cover plate 28 is sonic welded in place, and preferably the feathered edges are at the same time welded to the undersurface of the cover plate so as to form an air-tight seal. Such an arrangement prevents vapors from by-passing the baffle plates 32, 34, 36, 38 and 39 at their points of contact to the cover plate 28, as can now be readily understood.

Another embodiment of the invention is shown in FIGS. 6-9 wherein numerals having the suffix "a" have been assigned to components similar to those of the first mentioned embodiment. In FIG. 6 there is illustrated a canister 10a comprising a housing 12a which is of generally cylindrical configuration, having vapor ports 14a and 18a. The port 18a comprises an integrally molded end wall and fitting 20a. As in the previous construction, the housing is filled with a quantity of adsorbent material such as activated charcoal granules 30.

By the invention there is provided in the housing a unique partition 84 of helical configuration, which directs vapors entering either port along a swirling or spiral path as they move through the housing in FIG. 6. The partition is characterized by peripheral edges 86 that are preferably feathered and deformable, and which snugly engage and fit against the inner surface of the housing 12a, so as to minimize any tendency for vapors to leak therebetween. The diameter of the partition is slightly greater than the inner diameter of the housing such that the edges of the partition bend as in FIG. 12. The edges can optionally be sonic welded to the housing, if desired, to form an airtight seal. Along the axis of the partition 84 is a stiffening rod 88 that provides rigidity to the partition.

Also, by the present invention, there is disposed at the port 14a a PTC element in the form of a slab or wafer 52, having ring contacts 56, 58 with integral terminals 60a, 62a, respectively, that are accessible from the exterior of the housing. The wafer 52 is mounted adjacent a shoulder 66a in the housing, as in the previous construction. Disposed against the shoulder is a ring 65. A wave washer 64 and a retainer washer 68 are also provided, as before. The fitting 16a is molded as a separate piece and is sonic welded in place. It contains narrow slits, FIG. 8, to receive the terminals 60a, 62a of the ring contacts 56, 58 respectively. FIG. 9 illustrates two electrical leads 90, 92 extending from the terminals 60a, 62a, for connection to the vehicle's electrical system.

The wafer 52 has apertures 54 such that vapors entering or leaving the port 14a can pass therethrough. In addition, a retainer cup 94 is provided, having apertures in its bottom wall 96 and containing filter material 98 so as to confine the granules 30 in the housing. The filter material can be fiberglass wadding or the like. A similar retainer cup 100 is disposed adjacent the port 18a. It is displaced from the end wall by four circumferentially spaced shoulders 102, shown in dotted outline in FIG. 7, to facilitate dispersion of the vapors flowing through the apertures.

In the embodiment shown in FIG. 6, the intersection of the partition 84 and the inner surface of the cylindrical housing 12a is illustrated as being a true helix. It will be understood that some deviation from this structure could be made without materially affecting the operation of the canister. In the present disclosure the terms "helix" and "helical" are not intended to be strictly construed, but instead include similar geometric configurations that are generally screw-like in nature.

Another embodiment of the invention is illustrated in FIG. 13, wherein corresponding parts have been assigned similar reference numerals. In particular, the canister is designated 10b and comprises an elongate housing 12b having aligned vapor ports 14b and 18b disposed at opposite ends of the housing, side walls similar to those indicated 22 and 24 in FIG. 1, and a bottom wall 26b, which together form a trough. The internal structure involving the interleaved baffle plates is identical to the construction of the embodiment of FIGS. 1-5.

By the invention, the housing trough is molded as a single integral piece, and has a support shoulder or saddle 74b that is molded integral with the bottom wall 26b and the side walls of the housing. A block 76b is integrally formed with the housing bottom wall, and provides support for vanes similar to those labelled 40 and 42 in FIG. 1, and for a retainer cup 70. The latter is carried on the saddle and has multiple apertures in its bottom wall 72. As before, the cup contains filter material 71 which holds captive the granules 30 of adsorbent material.

A similar apertured retainer cup (not shown) is mounted adjacent the port 18b.

In the canister 10b, the heating structure involving the PTC material 52 of FIG. 1 has been omitted. Thus, the canister 10b can be thought of as a "passive" type, as opposed to the construction of FIGS. 1–5, which is "active" by virtue of its self-contained PTC heater 52.

Yet another embodiment of the invention is shown in FIG. 14. The canister 10c is illustrated in fragmentary axial section, and has a vapor port 14c. Structurally it is similar to that of the embodiment of FIGS. 6–9, except that it does not contain a heater structure. The housing 12c is of cylindrical configuration, having a helical partition 84c. Disposed at the port 14c is a retainer cup 94 having an apertured bottom wall 96. The port 14c is constituted as a unitary end fitting 16c, which is seated in an annular recess in the end of the housing 12c; and is sonically welded in position. The canister 10c, not having a heater, is also considered to be of the "passive" type, as opposed to the "active" unit of FIGS. 6–9.

The operation of the automotive fuel vapor recovery system of the invention can now be readily understood by referring to FIG. 15, which illustrates a fuel tank 104 having a filler pipe 106 and a vapor vent port 108. The vent port preferably connects with a T-fitting or other vapor-splitting device 110, which extends to a control valve 112 that is in series with the fuel vapor line 114 leading to the carburetor or intake manifold of the engine. The valve 112 is normally closed when the vehicle engine is off. The other branch of the T-fitting 110 leads to one or more of the canisters described above.

FIG. 15 illustrates three canister units, two being of the "passive" type as shown in FIGS. 13 or 14, and the third being of the "active" type, illustrated in FIGS. 1–5 or 6–9, respectively. The port 14 or 14a of the "active" canister vents to the atmosphere, and preferably a protective vent cap 116 is placed over this port.

It will be understood that a single canister can be employed, or multiple units connected in series or parallel. The number of canisters chosen for a particular installation will depend upon the volume of the fuel tank, since during filling of the latter, an amount approaching that volume, of fuel-laden vapor will have to be adsorbed; with larger tanks on the order of 20 gallons or more, one canister may not have sufficient capacity to adsorb the vapors delivered to it during a typical 30–60 second filling operation.

For purposes of explanation, it is assumed that three canisters are employed in an installation as illustrated in FIG. 15. The two canisters 10b do not contain heaters, whereas the canister 10 does, and the port 14 has the location indicated, adjacent the cap 116, and is open to the atmosphere. Adjacent canisters are connected by suitable vapor lines, which can take the form of hoses constituted of gasoline-resistant rubber substance. The port of one passive canister 10b is continuously connected through the T-fitting 110, to the vent port 108 on the vehicle's fuel tank 104. While the vehicle is idle, valve 112 is closed. When the tank is being filled, gasoline-laden vapors will flow from the T-fitting into the port 18b of the left canister 10b in the figure. As the granules 30 adjacent the port 18b begin to saturate with stored gasoline vapor/condensate, adsorption gradually begins to occur farther downstream, nearer the port 14b. Excess fuel-laden vapor will flow out through this port and into the middle canister 10b in FIG. 15, depositing additional fuel vapor/condensate therein. The exhaust from this center canister 10b will be introduced into the third canister 10, which is the "active" unit, containing the heater.

Referring now to FIG. 1, during venting of the tank, in all of the canisters the baffle plate 32 directs vapor flow in an upward direction toward side wall 22; the baffle plate 36 directs the flow downwardly in this figure, toward side wall 24. Similarly, baffle plates 34 and 38 direct the vapor flow back and forth, transversely of the axis of the housing as the fuel-laden vapor travels toward the right. While the vehicle is idle, or during the filling of its tank, the PTC heater 52 of the canister 10 is not energized, and the valve 112 is closed. All fuel-laden vapors which are displaced by the gasoline entering the tank thus must flow into the port 18b of the left canister 10b in FIG. 15. The vapor emanating from the port 14 adjacent the cap 116 is filtered, that is, it consists of air containing little or no gasoline content, since the fuel has presumably been almost completely adsorbed by the granules 30 in each of the three canisters. In this respect, the three series-connected, in-line canisters 10b, 10b and 10 constitute a "breather" for the fuel tank 104; the present invention thus involves a vapor recovery breather for volatile fuel systems.

With the tank filled and shortly after the engine is started, the valve 112 is opened by suitable automatic controls (not shown), and the PTC material 52 is energized through terminals 60, 62 by suitable time delay control circuitry (not shown). Vacuum applied to the line 114 will result in drawing off of some of the fuel vapor/condensate stored in the granules 30 of the three canisters, 10b, 10b, and 10. At low temperatures this release of stored fuel vapor/condensate occurs relatively slowly. However, upon energization of the PTC material, vapors in the form of fresh air entering the port 14 adjacent the cap 116, that is the port 14 of the "active" canister, will be heated by conduction and will in turn transfer much of the heat to the granules 30 therein, causing an increase in the rate at which they release the stored fuel vapor/condensate. Eventually most of the stored fuel substance will be purged from all three canisters, especially if the vehicle is operated for any length of time.

The PTC material 52 is self-regulating as to its heat output. Initially the current through the PTC material is relatively high, typically 5 amperes or so at an applied voltage of 12–14 volts d.c., resulting in rapid heating thereof. Due to the nature of the PTC material, the current is automatically reduced as the temperature rises so that no external control or switching circuitry is required. During prolonged energization of the PTC material, the current drops to a safe steady state value which depends on ambient temperature, and the flow rate of the (fresh air) vapors entering the port 14 adjacent the cap 116. Optionally there may be provided a time delay circuit as the vehicle is being started, in order to avoid a situation where the vehicle battery is providing current to the PTC material simultaneously with energization of the starting solenoid and starter motor, etc. Thus energization of the PTC mass would be delayed until the engine was running with the vehicle's alternator fully operative.

If the canister 10a is substituted for the canister 10 in the arrangement of FIG. 15, similar operation will occur. In particular, with the valve 112 closed and the tank being filled, fuel-laden vapors pass through the first two canisters 10b, 10b, releasing some fuel to the granules 30 therein, and thereafter entering the port 18a. Throughout its travel, the fuel vapor flow is directed along a serpentine or swirling path of considerable length. The initial influx of fuel-laden vapors is picked up by those granules 30 of the first canister 10b, whereas subsequently received vapors will be accumulated by granules 30 of the center canister 10b and end canister 10a.

After the vehicle is started and its alternator is operating normally, valve 112 is opened, the PTC element 52 in FIG. 6 is energized and the resultant manifold vacuum appearing on line 114 begins to draw vapors from right to left in FIG. 15, through all three canisters, with fresh air being drawn in through the port 14 (14a) adjacent the cap 116. Simultaneously heat from the PTC wafer 52 is transferred to the incoming fresh air which in turn transfers some of it to the granules 30 and thus enhances their release of the stored fuel vapor/condensate. After a period of operation, most of the stored fuel is purged from the three canisters, and they are thus prepared for subsequent fuel vapor storage when the vehicle becomes idle again.

The partition shown in FIG. 6 contains a total of three complete helical convolutions, although a greater or lesser number could be employed. The effective path taken by vapor flowing between the ports 14a and 18a is increased by a factor of at least several times as compared with a straight-line path therebetween. Accordingly, more effective use is made of the adsorbtion capabilities of the granules 30 since a larger number of them is exposed to the fuel-laden vapors. This is in sharp contrast to prior constructions where a cylindrical or square canister was employed, and wherein vapor flow was not really channelled in any particular direction along the canister interior.

As presently understood, the canister constructions of the invention as described above are more efficient than those previously developed, since the storage capacity of a given volume of granules 30 is increased over that realizeable with a simple cylindrical or square canister where some granules were relatively "inactive". Thus, equivalent fuel vapor/condensate storage capacity can be achieved in a canister unit which is of considerably smaller physical size.

While FIG. 15 illustrates the use of three canisters, a single canister could be employed, probably resulting in less efficient operation. If a single canister were to be used, it would preferably be one of the "active" types, that is, one containing a heater which would be capable of selective energization to assist in the purging function of the stored fuel vapor/condensate from the adsorbent granules 30.

Also, one or two canisters 10c could be substituted for those indicated 10b in FIG. 15, and employed with either canister 10 or 10a.

As presently considered, use of a single "passive" canister might have some benefit as compared with an installation employing no fuel vapor recovery system, but it is believed that in most applications, at least one "active" canister employing a heater would provide superior results.

The disclosed devices are thus seen to constitute a distinct advance and improvement in the field of fuel vapor recovery canisters.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A fuel vapor recovery canister, comprising in combination:
    (a) a housing having an outer wall and two spaced-apart vapor ports disposed in said wall,
    (b) a quantity of adsorbent material carried in said housing or adsorbing and storing fuel vapors entering one of said ports or releasing fuel vapors and permitting then to exit through said one port,
    (c) means carried by said housing defining a series of interleaved baffle plates disposed between the ports, wnereby any vapors entering one port are forced to flow along a serpentine path through the housing as they approach the other port,
    (d) a filter element disposed in the housing adjacent said outer wall and the other of said ports, said filter element confining said adsorbent material in the housing and being disposed in the path of vapor flow through said other port,
    (e) a mass of PTC material carried completely within the housing and disposed between said filter element and said other port of the housing, said material being arranged in heat-exchanging relation with air entering said other port so as to be capable of imparting heat to said air, said air in turn imparting heat to the said filter element and said adsorbent material contained in the housing, and
    (f) measn passing through the housing wall and extending externally of the housing, for making electrical connections to the PTC material to enable the latter to be electrically energized.

2. The invention as set forth in claim 1, wherein:
    (a) said baffle plates extend essentially completely across the housing between opposite portions of said wall.

3. The invention as set forth in claim 1, wherein:
    (a) said housing wall comprises a trough having a cover plate,
    (b) said baffle plates being integrally formed with said trough,
    (c) said cover plate closely fitting the opening of said trough and engaging the edges of the baffle plates thereof whereby leakage spaces between the said edges and the cover plate are largely eliminated.

4. The invention as set forth in claim 3, wherein:
    (a) said cover plate is sonic welded to both the trough and the edges of the baffle plates.

5. Th invention as set forth in claim 1, wherein:
    (a) said baffle plates comprise two sets of interleaved plates, one set being carried by one portion of the housing wall and the other set being carried by an opposite portion thereof,
    (b) each set being integrally formed with said wall.

6. The invention as set forth in claim 1, wherein:
    (a) at least one of said vapor ports comprises a tubular nipple for connection to a vapor line.

7. The invention as set forth in claim 1, wherein:
    (a) said mass of PTC material comprises a wafer extending substantially across said other vapor port of the housing.

8. The invention as set forth in claim 1, wherein:
    (a) said mass of PTC material comprises a disk having transverse apertures through which air entering said other vapor port passes prior to its entry into the housing interior.

9. The invention as set forth in claim 1, wherein:
    (a) said means for making electrical connections to the PTC material comprises a pair of ring contacts, said ring contacts engaging the PTC material at spaced apart points thereon and having terminals respectively extending through the housing wall to the exterior thereof.

10. The invention as set forth in claim 1, and further including:
(a) means defining a pair of diverter vanes in the housing adjacent one of the vapor ports thereof, to channel vapor entering therethrough toward the outer wall of the housing.

11. The invention as set forth in claim 1, and further including:
(a) means defining a pair of collector vanes at the other vapor port of the housing.

12. The invention as set forth in claim 1, wherein:
(a) said adsorbent material comprises activated charcoal.

13. A fuel vapor recovery canister, comprising in combination:
(a) an elongate, tubular housing, said housing having a vapor port adjacent one end and another vapor port adjacent the other end,
(b) a quantity of adsorbent material carried in said housing for adsorbing and storing vapors entering one vapor port thereof, or releasing vapors and permitting them to exit through said one vapor port thereof,
(c) means carried by said housing defining a partition of generally helical configuration, whereby vapors entering said one of the vapor ports are forced to flow along a circuitous, generally helical, swirling path about the axis of the helix as they approach the other vapor port thereof,
(d) a filter element disposed in the housing adjacent said other port, said filter element confining said adsorbent material in the housing and being disposed in the path of vapor flow through said other port,
(e) a mass of PTC material carried completely within the housing and disposed between said filter element and said other port, said material being arranged in heat-exchanging relation with air entering through the said other port so as to be capable of imparting heat to said air, said air in turn imparting heat to the said filter element and said adsorbent material contained in the housing, and
(f) means passing through the housing wall and extending externally of the housing, for making electrical connections to the PTC material, so as to enable the latter to be electrically energized.

14. The invention as set forth in claim 13, wherein:
(a) said housing has a wall with an inner surface,
(b) said partition having peripheral edges in engagement with the inner surface of the wall of the housing.

15. The invention as set forth in claim 13, wherein:
(a) said housing has a wall with a cylindrical inner surface,
(b) said partition having peripheral edges,
(c) the peripheral edges of the partition generally defining a helix at their points of intersection with the said inner surface of the housing.

16. The invention as set forth in claim 13, wherein:
(a) said housing has a wall with a cylindrical inner surface,
(b) said partition having peripheral edges,
(c) the peripheral edges of the partition being sonic welded to the inner surface of the housing.

17. The invention as set forth in claim 13, and further including:
(a) a stiffening rod disposed at the axis of the partition, to render it more rigid.

18. The invention as set forth in claim 13, wherein:
(a) said partition extends through essentially at least three complete convolutions between the vapor ports of the said housing.

19. The invention as set forth in claim 13, wherein:
(a) at least one of said vapor ports comprises a tubular nipple for connection to a vapor line.

20. The invention as set forth in claim 13, wherein:
(a) said mass of PTC material comprises a wafer extending substantially across said other vapor port of the housing.

21. The invention as set forth in claim 13, wherein:
(a) said mass of PTC material comprises a disk having transverse apertures through which air entering said other vapor port of the housing passes prior to its entry into the housing.

22. The invention as set forth in claim 13, wherein:
(a) said housing has a wall,
(b) said means for making electrical connections to the PTC material comprises a pair of ring contacts, said ring contacts engaging the PTC material at spaced apart points thereon and having terminals respectively extending through the housing wall to the exterior thereof.

23. A fuel vapor recovery canister, comprising in combination:
(a) a housing having an outer wall and spaced-apart vapor ports disposed in said wall,
(b) a quantity of adsorbent material carried in said housing for adsorbing and storing fuel vapors entering one of said ports or releasing fuel vapors and permitting them to exit through one of the ports thereof, and
(c) means carried by said housing defining a series of interleaved baffle plates disposed between the ports, whereby any vapors entering one port are forced to flow along a serpentine path through the housing as they approach the other port,
(d) said housing wall comprising a trough having a cover plate,
(e) said baffle plates being integrally formed with said trough,
(f) said cover plate closely fitting the opening of said trough and engaging the edges of the baffle plates thereof whereby leakage spaces between the said edges and the cover plate are largely eliminated,
(g) the edges of said baffle plates being feathered and deformable,
(h) the housing cover plate, when installed, effecting a deformation of said feathered edges and establishing a seal therewith, to prevent by-passing of said baffle plates by said vapors.

24. A fuel vapor recovery canister, comprising in combination:
(a) an elongate, tubular housing, said housing having a vapor port adjacent one end and another vapor port adjacent the other end,
(b) a quantity of adsorbent material carried in said housing for adsorbing and storing vapors entering one vapor port thereof, or releasing vapors and permitting them to exit through one vapor port thereof, and
(c) means carried by said housing defining a partition of generally helical configuration, whereby vapors enetering one of the vapor ports is forced to flow along a circuitous, generally helical, swirling path about the axis of the helix as they approach the other vapor port thereof, (d) said housing having a wall with a cylindrical inner surface, (e) said partition having peripheral edges, (f) the peripheral edges of the partition being feathered and the diameter of the helix defined by said edges slightly exceeding the diameter of the inner surface of the housing, whereby the edges are deformed by the said surface when the partition is inserted into the housing, to form a seat therewith.

25. A fuel system for a vehicle, said system comprising in combination:

(a) a fuel tank having a vapor vent port, (b) a vapor recovery canister, comprising in combination a housing having an outer wall and spaced-apart vapor ports disposed in said wall, (c) means providing communication between said fuel tank vapor vent port and one of said housing vapor ports, (d) a quantity of adsorbent material carried in said housing for adsorbing and storing fuel vapors entering said one port, or for releasing fuel vapors and permitting the same to exit through said one port, the other of said housing ports constituting a combination breather and fresh air inlet port, (e) means carried by said housing defining a series of interleaved baffle plates disposed between the housing ports, whereby vapors entering said one housing port are forced to flow along a serpentine path through the housing as they approach the other housing port, (f) a filter element disposed in the housing adjacent said outer wall and said fresh air inlet port, said filter element confining said adsorbent material in the housing and being disposed in the path of air flow through the fresh air inlet port, (g) a mass of PTC material carried comepletely within the housing and disposed between said filter element and the fresh air inlet port of the housing, said PTC material being arranged in heat-exchanging relation with fresh air entering said fresh air inlet port so as to be capable of imparting heat to said fresh air, said fresh air in turn imparting heat to the said filter element and said adsorbent material contained in the housing, and (h) means passing through the housing wall and extending externally of the housing, for making electrical connections to the PTC material to enable the latter to be electrically energized.

26. A fuel system for a vehicle, said system comprising in combination:

(a) a fuel tank having a vapor vent port, (b) a vapor recover canister, comprising in combination an elongate, tubular housing, said housing having a vapor port adjacent one end and another vapor port adjacent the other end, (c) means providing communication between said fuel tank vapor vent port and one of said housing vapor ports, (d) a quantity of adsorbent material carried in said housing for adsorbing and storing vapors entering said one housing port, or releasing fuel vapors and permitting them to exit through said one housing port, the other of said housing ports constituting a combination breather and fresh air inlet port, (e) means carried by said housing defining a partition of generally helical configuration, whereby vapors entering either housing port are forced to flow along a circuitous, generally helical, swirling path about the axis of the helix as they approach the other housing port, (f) a filter element disposed in the housing adjacent said fresh air inlet port, said filter element confining said adsorbent material in the housing and being disposed in the path of vapor flow through the fresh air inlet port, (g) a mass of PTC material carried completely within the housing and disposed between said filter element and the fresh air inlet port of the housing, said PTC material being arranged in heat-exchanging relation with fresh air entering through the said fresh air inlet port so as to be capable of imparting heat to said fresh air, said fresh air in turn imparting heat to the said filter element and said adsorbent material contained in the housing, and (h) means passing through the housing wall and extending externally of the housing, for making electrical connections to the PTC material, so as to enable the latter to be electrically energized.

* * * * *